(12) United States Patent
Kneckt et al.

(10) Patent No.: US 7,756,096 B2
(45) Date of Patent: Jul. 13, 2010

(54) TRANSMISSION RESOURCE RESERVATION MANAGEMENT IN WIRELESS NETWORK

(75) Inventors: Jarkko Kneckt, Espoo (FI); Heikki Berg, Viiala (FI)

(73) Assignee: Nokia Corporation, Espoo (FI)

( * ) Notice: Subject to any disclaimer, the term of this patent is extended or adjusted under 35 U.S.C. 154(b) by 286 days.

(21) Appl. No.: 12/078,057

(22) Filed: Mar. 26, 2008

(65) Prior Publication Data

US 2008/0298390 A1 Dec. 4, 2008

(30) Foreign Application Priority Data

May 29, 2007 (FI) .................................. 20075387

(51) Int. Cl.
*H04W 4/00* (2009.01)
(52) U.S. Cl. ...................... 370/338; 370/468
(58) Field of Classification Search ........................ None
See application file for complete search history.

(56) References Cited

U.S. PATENT DOCUMENTS

| 5,790,535 | A | 8/1998 | Kou | |
|---|---|---|---|---|
| 6,363,062 | B1 * | 3/2002 | Aaronson et al. | 370/348 |
| 7,349,349 | B2 * | 3/2008 | Acharya et al. | 370/254 |
| 2005/0002355 | A1 * | 1/2005 | Takano | 370/329 |
| 2006/0268803 | A1 * | 11/2006 | Lee et al. | 370/338 |
| 2006/0274680 | A1 * | 12/2006 | Zhu et al. | 370/278 |
| 2007/0060141 | A1 * | 3/2007 | Kangude et al. | 455/445 |
| 2007/0110102 | A1 | 5/2007 | Yagyuu et al. | |
| 2007/0195728 | A1 | 8/2007 | Chen et al. | |
| 2008/0181173 | A1 * | 7/2008 | Wei | 370/329 |

FOREIGN PATENT DOCUMENTS

| JP | 2001223634 | 8/2001 |
|---|---|---|
| WO | WO 03/041431 A1 | 5/2003 |

OTHER PUBLICATIONS

Carlson et al, A Distributed End-to-End Reservation Protocol for IEEE 802.11-based Wireless Mesh Networks, IEEE, 10 pages, 2006.*
Joe, QoS-aware MAC with Reservation for Mobile Ad-Hoc Networks, IEEE, 5 pages, 2004.*
International Search Report PCT/FI2008/050304 filed May 27, 2008.

* cited by examiner

*Primary Examiner*—Frank Duong
(74) *Attorney, Agent, or Firm*—Squire, Sanders & Dempsey, LLP

(57) ABSTRACT

A flexible transmission resource reservation scheme and data transmission scheme is provided for a wireless network. A source node transmits a data transfer reservation request for a transmission resource to at least one neighboring node including at least one target node of the wireless network. The source node may have data to be transmitted or may anticipate data reception from at least one of the target nodes. Then, the source node receives from the at least one neighboring node an acknowledgment to reserve the requested transmission resource for data transfer between the source node and the at least one target node. Thereafter, data is transferred between the source node and the at least one target node within the reserved transmission resource.

38 Claims, 3 Drawing Sheets

TRANSMISSION RESOURCE RESERVATION MANAGEMENT IN WIRELESS NETWORK

CROSS REFERENCE TO RELATED APPLICATION

This application claims priority to Finnish Patent Application Serial No. 20075387 filed May 29, 2007 in Finland. The subject matter of the earlier filed application is hereby incorporated by reference.

FIELD OF THE INVENTION

The invention relates to communications in a wireless network.

BACKGROUND

Mesh networking is a way to route data, voice and instructions between nodes of a mesh network. In a mesh network, a connection between a source node and a destination node is arranged through a plurality of relay nodes between them, but routing may be reconfigured around broken or blocked paths by "hopping" from node to node until the destination node is also reached. Mesh networks may be mobile or fixed networks. Mobile ad-hoc networking featured in many consumer devices is one type of a mesh network. Another example of a mesh network is defined in the IEEE 802.16 specifications.

In other words, if the source node has data to be transmitted to the destination node through one or more relay nodes, the source node first transmits the data to a relay node capable of communicating directly with the source node, then the relay node transmits the data further to the next relay node, and so on until the data reaches the destination node. According to medium access control (MAC) of a wireless mesh network, each node of the network has a half-duplex transceiver and, when a source node has data to be transmitted to a neighboring node (a relay node or the destination node), the source node first agrees with the neighboring node on a transmission resource to be used in the transmission of the data. This is carried out during a "beaconing period" in which nodes close to each other reserve transmission resources in a predetermined or randomized order. The transmission resource may include a time interval on a frequency channel, for example.

During the beaconing period, the source node reserving a transmission resource transmits a reservation message to each one-hop neighbor. If a neighboring node is not active, i.e. neither transmitting nor receiving, within the requested transmission resource, it may transmit a positive acknowledgment to the source node. The reservation becomes valid, if the source node receives the positive acknowledgment from all the neighboring nodes. The data is then transmitted from the source node to a given neighboring node within the reserved transmission resource.

The reservation scheme described above lacks flexibility in that only the node having data to be transmitted may make a reservation and, thereby, control data transmission within the reserved transmission resource. Furthermore, transmission of the data is only possible from the node making the reservation.

BRIEF DESCRIPTION OF THE INVENTION

An object of the invention is to provide an improved reservation and data transmission scheme for a wireless network.

According to an aspect of the invention, there is provided a method, comprising: transmitting, from a source node to at least one neighboring node including at least one target node, a data transfer reservation request for a transmission resource in a wireless network regardless of whether the source node has data to be transmitted or received; receiving, from the neighboring nodes, an acknowledgment to reserve the requested transmission resource for data transfer between the source node and the at least one target node; and transferring data within the reserved transmission resource.

According to another aspect of the invention, there is provided an apparatus comprising an interface configured to transmit and receive signals. The apparatus further comprises a control unit configured to transmit, through the interface, a data transfer reservation request addressed to at least one neighboring node including at least one target node of a wireless network to request a reservation for a transmission resource, regardless of whether the control unit has data to be transmitted or received; to receive an acknowledgment from the at least one neighboring node to reserve the requested transmission resource for the data transfer with the at least one target node; and to transfer data within the reserved transmission resource.

According to another aspect of the invention, there is provided a wireless network comprising a source node and at least one target node. The source node comprises a communication interface configured to provide a communication connection with at least one other node and a control unit configured to transmit, through the communication interface, to at least one neighboring node including at least one target node a data transfer reservation request for a transmission resource, regardless of whether the source node has data to be transmitted or received; to receive, from the at least one neighboring node, an acknowledgment to reserve the requested transmission resource for data transfer between the source node and the target node; and to transfer data with the at least one target node within the reserved transmission resource. The at least one target node comprises a communication interface configured to provide a communication connection with at least the source node and a control unit configured to receive, through the communication interface, the data transfer reservation request for the transmission resource from the source node; to transmit to the source node an acknowledgment for the reservation for the requested transmission resource, if the target node has no pending data transfer for the requested transmission resource; and to transfer data with the source node within the reserved transmission resource.

According to another aspect of the invention, there is provided an apparatus, comprising: means for transmitting a data transfer reservation request addressed to at least one neighboring node including at least one target node of a wireless network to request a reservation for a transmission resource, regardless of whether the apparatus has data to be transmitted or received; means for receiving an acknowledgment from the at least one neighboring node to reserve the requested transmission resource for the data transfer with the at least one target node; and means for transferring data with the at least one target node within the reserved transmission resource.

According to another aspect of the invention, there is provided a computer program distribution medium readable by a computer and encoding a computer program of instructions for executing in a control unit a computer process for communicating in a wireless network. The computer program product comprises: a first code section controlling the transmission of a data transfer reservation request addressed to at least one neighboring node including at least one target node of the wireless network to request a reservation for a transmission resource, regardless of whether the control unit executing the computer process has data to be transmitted or received; a second code section controlling reception of an acknowledgment from the at least one neighboring node to reserve the requested transmission resource for the data transfer with the at least one target node; and a third code section controlling the transfer of data with the at least one target node within the reserved transmission resource.

LIST OF DRAWINGS

In the following, the invention will be described in greater detail with reference to the embodiments and the accompanying drawings, in which FIG. 1 illustrates a topology of a mesh network in which embodiments of the invention may be implemented;

DESCRIPTION OF EMBODIMENTS

Figure 1:
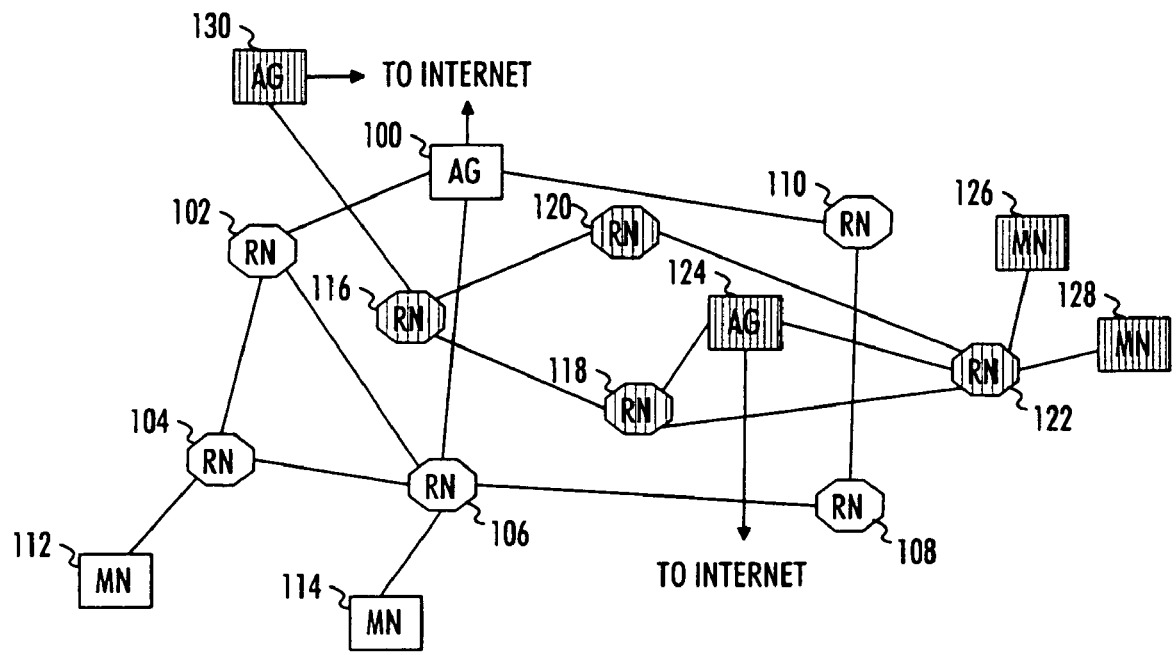

With reference to FIG. 1, examine an example of a wireless mesh network in which embodiments of the invention can be applied. The mesh network may be a wireless mobile ad-hoc network, for example. In the example illustrated in FIG. 1, two wireless mesh networks are arranged to share at least partly the same frequency spectrum. The mesh networks may include fixed relay nodes configured simply to convey data, mobile nodes working as source and/or destination nodes for the data, and zero or more gateways providing a link to the Internet, for example. A first mesh network includes relay nodes 102, 104, 106, 108, and 110, mobile nodes 112 and 114 connected to the relay nodes 104, and 106, respectively, and a gateway 100 connected to the relay nodes 102, 106, and 110. A second mesh network includes relay nodes 116, 118, 120, and 122, mobile nodes 126 and 128 connected to the relay node 122, a first gateway 124 connected to the relay nodes 118 and 122, and a second gateway 130 connected to the relay node 116. The mesh networks are arranged to be able to provide the mobile nodes with a communication connection even if a communication link between the relay nodes is out of operation. More mobile nodes may be connected to the relay nodes 102 to 110 and 116 to 122.

Each node described in FIG. 1 may be arranged to have a communication interface configured to provide a physical layer communication connection at least with neighboring nodes. Furthermore, each node may be equipped with a control unit controlling the operations of the node. The control unit may control the physical layer communications but also higher layer operations including a medium access control (MAC) protocol. Since the two mesh networks operate at least partly on the same frequency spectrum, the control units may be configured to sense periodically the overlapping frequency spectrum to detect which frequency channels suffer from interference caused by the other mesh network and to provide neighboring nodes with information on the quality of the frequency channel to facilitate reservation of transmission resources.

Figure 2:
FIG. 2 illustrates nodes of the mesh network and exchange of information between the nodes.

Referring to FIG. 2, a source node 204 makes a reservation request to its neighboring nodes 202 and 206 in order to reserve a given transmission resource for data transfer. The actual node with which the source node 204 performs the data transfer may be a target node 206 but the source node 204 may need to communicate also with the other neighboring node(s) 202 on the reserved transmission resource in order not to reserve a transmission resource already utilized by the other neighboring node 202. Two neighboring communication links using the same transmission resource typically interfere with each other, which results in a collision. Therefore, the source node 204 ensures that there will be no collision with the data transmitted/received by the neighboring node 202.

The source node 204 may have data to be transmitted to the target node 206, or the source node 204 may be expecting a data transfer from the target node 206. In the latter case, the source node 204 may be receiving data from the target node on a regular basis and, therefore, the source node 204 may make a reservation for a transmission resource in advance to enable rapid transmission of data as soon as the data reaches the target node 206. The source node may also analyze routing information provided by the target node 206 and anticipate data transfer from the target node 206 to the source node as a result of the analysis of the routing information. In such a case, both a transmitter node (the target node 206) and a receiver node (the source node 204) may make reservations for the transmission resource, thereby providing flexibility in the reservation management. Below, embodiments for optimizing the utilization of the reserved transmission resources will be described in detail.

Upon reception of the reservation request from the source node 204, the target node 206 and the other neighboring node 202 transmit a positive acknowledgment to the source node 204, if the nodes 202 and 206 have no active reservations for the requested transmission resource. In a wireless mesh network, the positive acknowledgment transmitted by the nodes 202 and 206 are also received by their respective neighbors 200 and 208. Upon reception of the positive acknowledgment from the neighboring nodes 202 and 206, the reservation becomes valid, and data may be transferred between the source node 204 and the target node 206 within the reserved transmission resource. In summary, the transmission resource is reserved such that the source node 204, the target node 206, and the other neighboring node 202 are idle, i.e. have no active reservations, within the transmission resource.

Figure 3:
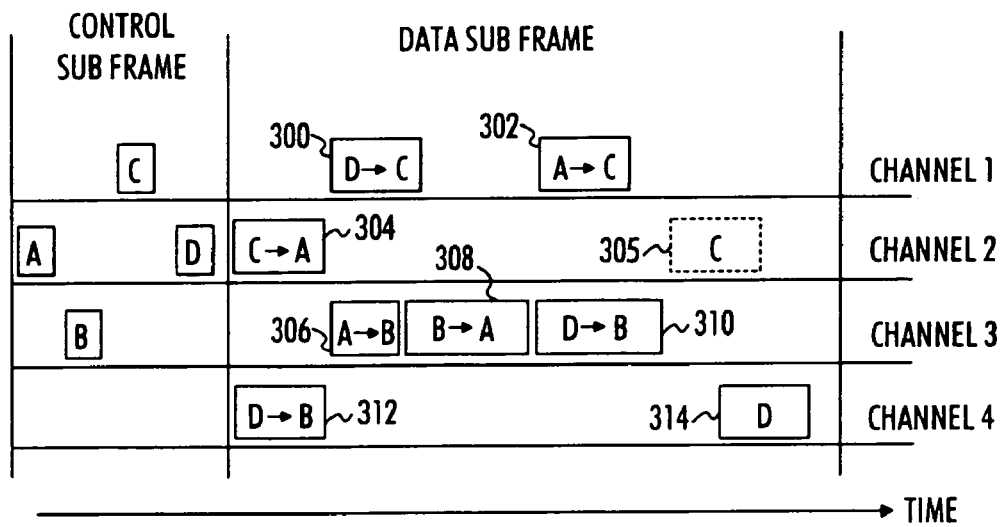
FIG. 3 illustrates reservation of transmission resources in the mesh network and data transmission within the reserved transmission resources according to an embodiment of the invention.

With reference to FIG. 3, let us consider a reservation and data transmission scheme according to an embodiment of the invention. The frame structure illustrated in FIG. 3 comprises a control sub-frame representing the beaconing period and a data sub-frame in which actual data may be transferred. Let us in this example assume that nodes A to D are able to communicate with each other. Within the beaconing period, node A makes reservations for transmission resources first. Node A may have data buffered for transmission to node C and may be expecting a data transmission from node B. Node A may also be provided with information that node C is currently sensing interference on frequency channels 3 and 4, while node B is sensing interference on frequency channel 1 and 2. Accordingly, node A may transmit a reservation request to its neighboring nodes to reserve a transmission time interval 302 comprising one or more data slots on the frequency channel 1 for data transfer with node C. Let us assume that the other nodes send a positive acknowledgment for the reservation, i.e. have no valid reservations for the transmission resource. Furthermore, node A may have already reserved, during a previous beaconing period, for example, another transmission time interval 308 on the frequency channel 3 for data transfer with node B. In other words, reservations for the transmission resources related to a given data transmission period may be requested during different beaconing periods.

Next, node B has the turn to make reservations. Node B may have no data buffered for transmission at the moment but it may be expecting transmission from nodes A and D. Accordingly, node B may select an available transmission resource on a frequency channel suitable for the nodes A, B, and D by reserving two transmission time intervals 306, 310 on the frequency channel 3. Similarly, node C making the reservation next may reserve a transmission time interval 300 on the frequency channel 1 for data transfer from node D and a transmission time interval 304 on the frequency channel 2 for transmission of data to node A. Additionally, node C may determine not to transfer any data within a given transmission resource 305 and, accordingly, transmit a message informing the other nodes that node C will not be present within the specified transmission resource 305. Node C is not making a reservation for the transmission resource 305 but simply informing the neighboring nodes that it will be performing functions other than transferring data. Accordingly, the other nodes will not request that transmission resource for the data transfer with node C. Node C may specify all the frequency channels 1 to 4 to inform the other nodes that node C will not be present during the time interval related to the transmission resource, or the nodes may be configured to expand the indication of a non-presence of a node in a given frequency channel to other parallel frequency channels so that there is no need to specify all the frequency channels but simply one.

Finally, node D may only have data buffered for transmission to node B and, accordingly, reserve a transmission time interval 312 on the frequency channel 4. Additionally, node D may determine to carry out channel measurements during the data sub-frame in question and accordingly, reserve a transmission resource for performing the channel measurements. In fact, node D makes the request to reserve a transmission resource 314 but does not intend to transfer data within the transmission resource. Therefore, this type of reservation is referred to as an empty reservation. A request for an empty reservation of a transmission resource is performed similarly as the reservations described above but in an empty reservation there is no need to include other nodes in the reservation. Accordingly, the node making the empty reservation indicates that it will not be present for data transfer within the requested transmission resource. Upon reception of positive acknowledgments from the neighboring nodes, the empty reservation becomes valid and node B may perform channel measurements within the reserved transmission resource 314 in order to determine, for example, an interference level within the frequency channel of the transmission resource 314.

Alternatively, the empty reservation may be made to reserve the transmission resource 314 for a transmission performed in another network. Referring to FIG. 1, in which two mesh networks operate on the same area, a node may belong to both mesh networks. Accordingly, when reserving a transmission resource for data transfer in one mesh network, the node may make an empty reservation for the same transmission resource in the other mesh network in order to prevent collisions.

In the data sub-frame, data is transferred between nodes A to D. Upon the occurrence of the transmission time intervals reserved by recipients expecting data transmission from another node, i.e. transmission time intervals 300, 306, 308, and 310, data may have arrived to the buffers of corresponding transmitter nodes and the data may be transmitted immediately to the respective recipients.

In addition to data and reservation signals, nodes A to D may exchange data traffic information comprising information on data flow between nodes A to D. The routing information exchanged between two nodes may be included in data packets transmitted between the two nodes during the data transmission period, and the routing information may include the following information (or at least one of the following): amount of data buffered for transmission from a transmitter node to a receiver node, current data rate, transmission repetition indicator indicating the rate of transmission time intervals between the two nodes, and the destination node of the data.

A receiver node receiving the routing information may analyze the routing information and perform reservations for transmission resource according to the analyzed routing information. For example, from the amount of data buffered at the transmitter node the receiver node may deduce the current data rate, the transmission repetition indicator, and/or whether or not the node should reserve additional transmission resource between the two nodes. If the receiver node determines that additional transmission resource should be reserved in order to prevent an overflow in the buffers of the transmitter node, the receiver node may transmit a request for new transmission resources for data transfer between the transmitter node and the receiver node, thereby increasing the amount of transmission resources and enhancing the data rate between the two nodes.

Furthermore, the routing information may be transferred between the nodes during the beaconing interval as attached to the reservation requests. The routing information transmitted by a source node having data to be transmitted may comprise at least the destination node of the data to be transmitted within the requested transmission resource. A target node receiving the reservation request from the source node may read the destination node from the routing information and, if the destination node is not the target node but another node to which the target node should convey the data, the target node may transmit a reservation request to the next node on the path from the target node to the destination during the next turn of the target node for making a reservation for a transmission resource. In other words, the target node may make the reservation to the next node as soon as the target node obtains routing information indicating a reservation request for data to be transmitted to the target node for the target node to forward towards the destination node. Naturally, the target node may reserve a transmission time interval after a transmission time interval requested by the source node so that the target node will first receive the data and then transmit the data forward. This will minimize the duration the target node has to store the data in its buffers and, thereby, decreases the buffer capacity requirements of the target node.

Enabling reservation of transmission resources regardless of whether a node making the reservation has data to be transmitted or is expecting data to be received makes the reservation scheme more flexible. For example, if the number of reservations per node is limited, the present solution enables reservation of more transmission resources between two nodes than a conventional solution in which only a transmitting node makes the reservations. The node making the reservation for a given transmission resource may control the transmission within the transmission resource. The node may provide indication on the transmission direction in the reservation request so that the nodes transferring data within the transmission resource have knowledge about the transmitting and receiving node. Furthermore, the control of the transmission may be given to a node transmitting data within the transmission resource regardless of whether or not the transmitting node has made the reservation of the transmission resource.

In the example of FIG. 3, the reservations are made for the data sub-frame subsequent to the control sub-frame used in making the reservations. Alternatively, the reservations made during the control sub-frame illustrated in FIG. 3 may be directed to a $K^{th}$ sub-frame, where K is 2 or more, following the control frame used in making the reservations.

Figure 4A:
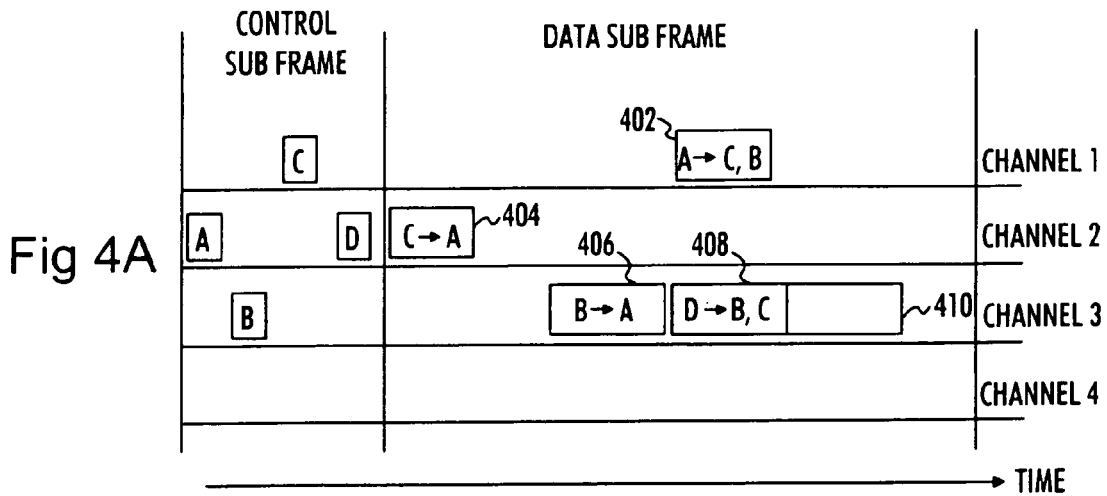
FIG. 4A illustrates allocation of a plurality of recipients to a single transmission resource according to an embodiment of the invention.
Figure 4B:
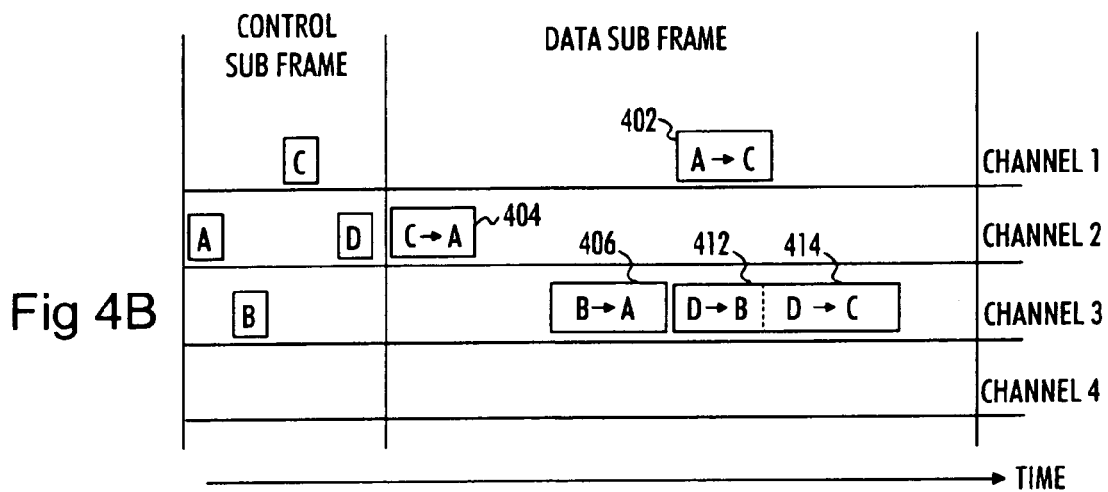
FIG. 4B illustrates data transmission within the reserved transmission resources according to reservations illustrated in FIG. 4A.

In case a recipient node expecting data transmission from a target node has made a reservation for a transmission resource but the data does not reach the target node in time to be transmitted in the reserved transmission resource, the reserved transmission resource is left unused. To increase the utilization of the reserved transmission resources, FIGS. 4A and 4B illustrate an embodiment in which a plurality of recipients may be allocated to share the same transmission resource. FIG. 4A illustrates the reservations for the transmission resources during the beaconing period, and FIG. 4B illustrates utilization of the reserved transmission resources within a data transmission period.

Let us assume the same situation as in the example described above with reference to FIG. 3. That is, node A has data to be transmitted to node D and is expecting a data transfer from node B, node B is expecting a data transfer from nodes A and D, node C has data to be transmitted to node A and is expecting a data transfer from node D, and node D has data to be transmitted to node B. Let us in this case for simplicity assume that every node A to D is capable of transferring data on every frequency channel 1 to 4.

In the beaconing period, node A makes the first reservation for a transmission resource 402 on the frequency channel 1 and a transmission resource 406 on the frequency channel 3. In other words, node A configures node C to monitor the transmission resource 402 for reception of data from node A. Additionally, node A requests node B to add node A to a recipient list of the node B for the specified transmission resource 406. Upon reception of a positive acknowledgment from node B, node A is configured to monitor the transmission resource 406 in case node B will obtain data to be transmitted to node A.

Thereafter, node B makes its reservations, and reserves a transmission resource 408 on the frequency channel 3 and, thereby, requests node D to add node B to a recipient list of the node D for the specified transmission resource 408 in case node D will obtain data to be transmitted to node B. Moreover, since node B is expecting a data transfer from node A, node B may request to share the reservation of the same transmission resource 402 node A has already reserved. Since node A owns the reservation of the transmission resource 402, node B may send a request to add node B to a recipient list of the transmission resource to node A. Node B may also send a reservation request to other neighboring nodes of node B to ensure that the neighboring nodes agree with the reservation, i.e. have no valid reservations for the transmission resource 402. Accordingly, a plurality of recipients may be allocated to share the same transmission resource, wherein the transmission resource is counted as a single reservation. Node A (and the other neighbors of node B) may then send a positive acknowledgment to node B and thus node B has been added to use the transmission resource 402. Note that while node B made a reservation for the transmission resource 402, node A is still controlling the data transfer within the transmission resource, since node A made the first reservation and/or node A is the node transmitting data within the transmission resource 402. Preferably, the control of transmissions within a given transmission resource is given to a node requesting to transmit data within the transmission resource.

Node C then reserves the transmission resource 404 on the frequency channel 2 for transmission of data to node A and a transmission resource 408 on the frequency channel 3 for data transfer from node D. In case the MAC scheme is implemented such that a transmitter node transmitting data within a given transmission resource is in control of all the transmissions within the transmission resource, node C may send a request to node D in order to make the reservation for the transmission resource 408 and to inform node D that node C is to be added as a recipient for the transmission resource. After the reception of a positive acknowledgment from node D (and the other neighboring nodes of node C), node D may become the owner of the reservation of the transmission resource 408 and control transmissions within the transmission resource 408, but the reservation may be counted as a reservation made by node D. In that case, the number of reservations available for node D is not reduced, since node C initiated the reservation.

Finally, node D makes its reservation. Remember that node D has data to be transmitted to node B. Since node D has already the transmission resource 408 reserved and available for transmitting data to node C, node D may make a request for an extension 410 to the transmission period 408. While FIG. 4A illustrates the extension 410 in the time interval of the transmission resource 408, the extension may be requested also in the frequency direction, i.e. the extension may be a reservation of another transmission frequency at the same time interval as the already reserved transmission resource 408. Furthermore, node D may send a query to add node B to the recipient list of the extended transmission resource 408+410. Upon reception of a positive acknowledgment from node B and neighboring nodes of node D, the transmission resource 408 is extended and node B is added to the recipient list of the extended transmission resource 408+410. In this case, the number of reservations of node D is neither reduced, since an already reserved transmission resource is only extended, i.e. no reservation requests for a new transmission resource is made.

When extending an existing transmission resource, node D may request the extension to the direction in which node B has no active reservations. In the example illustrated in FIG. 4A, extension in the frequency direction may not be possible unless node B is able to receive data simultaneously on a plurality of frequency channels, since node B is already a recipient within the transmission resource 402 on a parallel frequency channel at the same time interval. Therefore, and because node B has no transmissions or receptions after the transmission resource 408 on the same frequency channel 3, the extension may be requested in the time direction.

Reference is now made to FIG. 4B illustrating the actual data transfer within the reserved transmission resources. Node C transfers data to node A within the transmission resource 404 reserved by node C, and node B transfers data to node A within the transmission resource 406 reserved by node A. Node A had data to be transmitted to node C and, accordingly, node A transmits the data within the reserved transmission resource 402. Node B, on the other hand, was also expecting a data transmission from node A and, thus, also node B is monitoring the transmission resource 402 so as to detect a data transmission addressed from node A to node B. Node A may attach to the transmitted data a recipient field indicating a receiver node to which the data is addressed so that the nodes monitoring the transmission resource are able to detect the recipient of the data. Each node included in the recipient list and, therefore, monitoring the transmission resource may read the recipient fields included in data packets transmitted within the transmission resource and obtain the data addressed to a particular receiver node. Referring back to FIG. 4B, node A may not have obtained data destined to node B in time or the whole transmission resource is in that case consumed in transmission of data to node C and, therefore, no data is transmitted to node B within the transmission resource 402.

Node D transmits the data destined to node B within a first portion 412 of the reserved extended transmission period 408+410. Additionally, node D may have obtained data to be transmitted to node C and, accordingly, node D may transmit the data to node C within a second portion 414 of the extended transmission period 408+410. Node C may be configured to monitor the whole reserved transmission period 408+410 so as to detect a data transmission destined to node C. Node D may include a destination address in the data to enable an appropriate recipient to receive the data.

The embodiment described above with reference to FIGS. 4A and 4B provides an efficient reservation and utilization of transmission resources. For example, if node A did not consume the whole transmission resource 402 for transmission of data to node C and node A obtained data to be transmitted to node B before the expiry of the transmission resource 402, node A would then transmit the data to node B within the remaining portion of the reserved transmission resource 402 and the remaining portion would not be wasted. TCP (Transmission Control Protocol) data streams and VoIP (Voice over Internet Protocol) silent compression data streams may generate bursty data traffic, and arranging multiple recipients for a transmission resource increases the probability that there will be data to be transmitted to at least one recipient within the reserved transmission resource.

Figure 5:
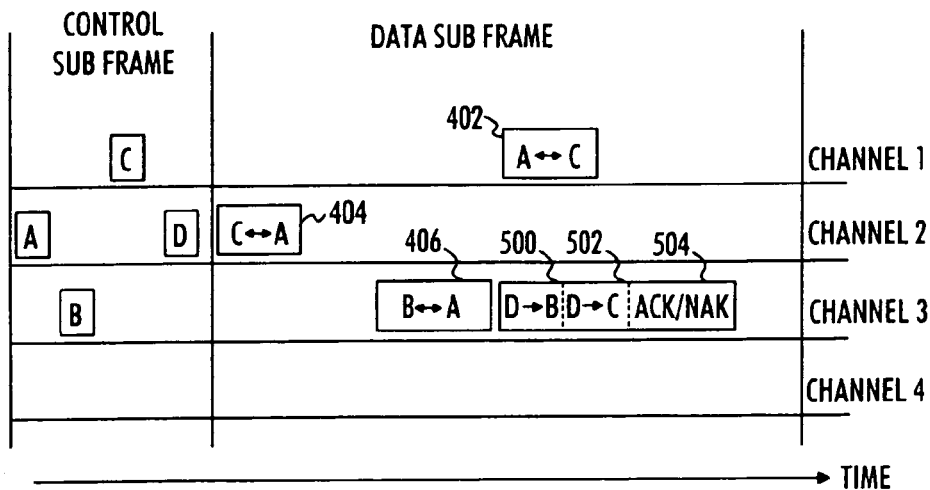
FIG. 5 illustrates multidirectional data transmission within the reserved transmission resources according to an embodiment of the invention.

Reserved transmission resources may also be utilized in a multidirectional transmission. One such solution is illustrated in FIG. 5 which illustrates a data transmission period including the reservations illustrated in FIG. 4A. In the embodiment illustrated in FIG. 5, the reserved transmission resources may be utilized for transmitting data from a first node to a second node but also for transmitting routing information and/or a MAC level acknowledgment indicating either a correct or an erroneous reception of a data packet. The acknowledgment may be transmitted from the second node back to the first node within the same transmission resource.

For example, node C may transmit data to node A within the transmission resource 404 and then indicate an end of transmission. If there is a portion of the transmission resource 404 remaining, node A may send an acknowledgment back to node C. With respect to the transmission resource 402 reserved by node A, node A may first transmit data to node C within the transmission resource and then indicate an end of transmission and a permission for node C to transmit data. The permission may be needed to prevent both nodes B and C transmitting data simultaneously, i.e. to prevent a collision. Accordingly, node C may then transmit an acknowledgment back to node A or even data to either node A or node B. In case the node primarily transmitting data within the transmission resource (node A in this case) has no more data to be transmitted and remaining transmission resources still exist, a node being primarily a recipient within the transmission resource may use the remaining portion of the transmission resource for transmitting data to another node that is primarily either a transmitter or a recipient within the transmission resource. Accordingly, the remaining portion of the transmission resource will not be wasted.

Similarly, node B may first transmit data to node A within the transmission resource 406 and then indicate an end of transmission. Thereafter, node A may transmit either an acknowledgment and/or data back to node B. Within the extended transmission resource 408+410, node D may first transmit data to node B within a first portion 500 of the transmission resource, then transmit data to node C within a second portion 502 of the transmission resource, and finally indicate an end of transmission and a permission for node B to transmit data. Then, node B may either transmit an acknowledgment back to node D or data to node D and/or node C within the third portion 504 of the transmission resource. When node B has no more data to transmit, node B may indicate an end of transmission. Upon detection of the end of transmission, node D controlling the transmission within the transmission resource may check whether or not there is a portion of the transmission resource remaining unused. If there is a portion of the transmission resource still available, node D may grant node C a possibility to transmit data. Accordingly, node C may either transmit an acknowledgment back to node D or data to node D and/or node B within the remaining portion (not shown) of the transmission resource. Accordingly, the reserved transmission resource may be used for bi-directional or multi-directional data transmission, thereby improving the utilization of the reserved transmission resources.

To implement the embodiments described above, a reservation control field illustrated in Table 1 may be transmitted by a node making a reservation during the beaconing period.

TABLE 1

|  | Reserved | ARER | Direction | ARER | Direction |
|---|---|---|---|---|---|
| Length | N | 2 | 2 | 2 | 2 |

In the reservation control field illustrated in Table 1, the reserved field having a length of N bits may be reserved for a specific use not described herein in detail. An "Amending Recipient to Existing Reservation (ARER)" field may be a 2-bit field used to indicate either new reservations or changes to existing reservations according to the embodiment illustrated in FIGS. 4A and 4B. An exemplary denotation for the four possible 2-bit patterns is described next.

In case a node transmits bit word '00' in the ARER field, the node indicates a reservation of a new transmission resource not yet reserved by any node. Bit word '01' may represent an extension of an already reserved transmission resource. The extension may apply for the whole group of nodes that already serve as either transmitters or recipients within the transmission resource. The node transmitting the ARER field having value '01' may indicate the direction of the extension, i.e. whether a longer transmission time interval or an additional frequency channel should be allocated for the reservation. The degree of the extension may be fixed, or the node transmitting the ARER field having value '01' may also define the degree of the extension. The extension becomes valid, if the node receives a positive acknowledgment from all the other nodes or when a timeout period of predetermined length has lapsed. On the other hand, if the node receives even a single negative acknowledgment, the extension becomes void and the existing resources are used without the extension.

Bit word '10' indicates an addition of a recipient to an already reserved transmission resource. When a node controlling the transmissions within the transmission resource, i.e. the primary transmitter of data within the transmission resource, transmits the bit word '10' in the ARER field, it requests to add another node to a recipient list for the transmission resource, and also identifies the node to be added. On the other hand, when a node other than the node controlling the transmissions within the transmission resource transmits the bit word '10' in the ARER field, it requests to be added to a recipient list for the transmission resource. If the node requesting an addition of a recipient to the already reserved transmission resource receives only a single negative acknowledgment response, the request is denied and the existing recipient list is maintained without additions.

Bit word '11' denotes a removal of a given recipient from the recipient list of an already reserved transmission resource or a release of an already reserved transmission resource. A node controlling the transmission within the transmission resource may remove any recipient from the recipient list. On the other hand, a node belonging to the recipient list may only request the removal of the node itself from the recipient list. Furthermore, the node controlling the transmission within the transmission resource, i.e. the node owning the reservation of the transmission resource, may release the resource. The reason for releasing the transmission resource may be that the node owning the reservation wants to change the reservation to another frequency channel or that the node has no data to be transmitted, for example. The resource may be released in order to speed up the reutilization of the transmission resource. Since this request concerns removing a recipient and/or releasing the transmission resource, the request may not receive a negative acknowledgment, because an admission of the request will not cause any collisions.

Referring to Table 1, a direction indication field may include a 2-bit word to indicate the direction(s) of transmission within a transmission resource. An exemplary denotation for the four possible 2-bit patterns is described next. A node transmitting bit word '00' in the direction indication field indicates that it will not be present in a transmission resource indicated in a message containing the reservation control field. The node may be performing channel sensing/measurements during the transmission time interval of the transmission resource, for example, and is therefore not able to receive data. A node belonging to a recipient list of a given transmission resource may transmit a reservation control field comprising '11' in the ARER field and '00' in the direction indication field to remove itself from the recipient list.

A node transmitting bit word '01' in the direction indication field indicates that the node requests to transmit data to a target node within the specified transmission resource. For example, a source node transmitting '00' in the ARER field and '01' in the direction indication field requests a reservation for a new transmission resource for transmission of data to a target node. The source node may select the new transmission resource such that the neither the target node nor the other neighboring nodes of the source node have any active reservations in the transmission resource. In other words, the neighboring nodes are not recipients for any other transmitter than the source node, thus preventing collisions. If this condition is valid for the neighboring nodes, including the target node, the neighboring nodes transmit a positive acknowledgment to the source node. Accordingly, the source node becomes the owner of the reservation and controls transmissions within the transmission resource. As another example, a source node transmitting '10' in the ARER field and '01' in the direction indication field requests to be added to the recipient list of the specified transmission resource but also requests a possibility for data transmission within the transmission resource. The owner of the reservation may grant this possibility and, if reserved transmission resources remain in excess after the transmission made by the owner of the reservation which was the primary transmitter, the source node may be granted data transmission within the remaining transmission resource (see description related to the transmission within the transmission resource 408).

A node transmitting bit word '10' in the direction indication field indicates that the node requests to receive data from a target node within the specified transmission resource. For example, a source node transmitting '10' in the ARER field and '10' in the direction indication field requests to be added to a recipient list of the specified transmission resource to receive data from a target node.

A node transmitting bit word '11' in the direction indication field requests bi-directional transmission between a target node within the specified transmission resource. For example, a source node transmitting '00' in the ARER field and '11' in the direction indication field requests a new transmission resource for bi-directional transmission with a target node. Within the transmission resource, the source node may transmit data to the target node, and the target node may transmit acknowledgments back to the source node.

Table 1 illustrates two ARER fields and two direction indication fields. One ARER field and one direction indication field may be linked together and associated with one reservation request. Accordingly, two reservation requests may be made within the reservation control field described in Table 1. A plurality of reservation requests may be carried out with one reservation signal to reduce signaling overhead within the beaconing period. Accordingly, target nodes receiving the requests and responding to them do not have to process a plurality of requests received at different times from the same source node, i.e. the reservation requests may be handled together. As a result, the duration of the beaconing period may be shortened, thereby enabling longer data transmission periods and improving the efficiency of the system. The number of reservation requests that may be made at once may be more than two. Advantageously, the number of reservation requests that may be made at once may be the maximum number of active reservations available for a single node.

In general, a source node may make its reservations on the basis of the knowledge of current reservations and interference experienced by neighboring nodes. In practice, the source node may request a transmission resource such that one or more target nodes have neither a data transfer nor are experiencing high interference within the transmission resource.

Figure 6:
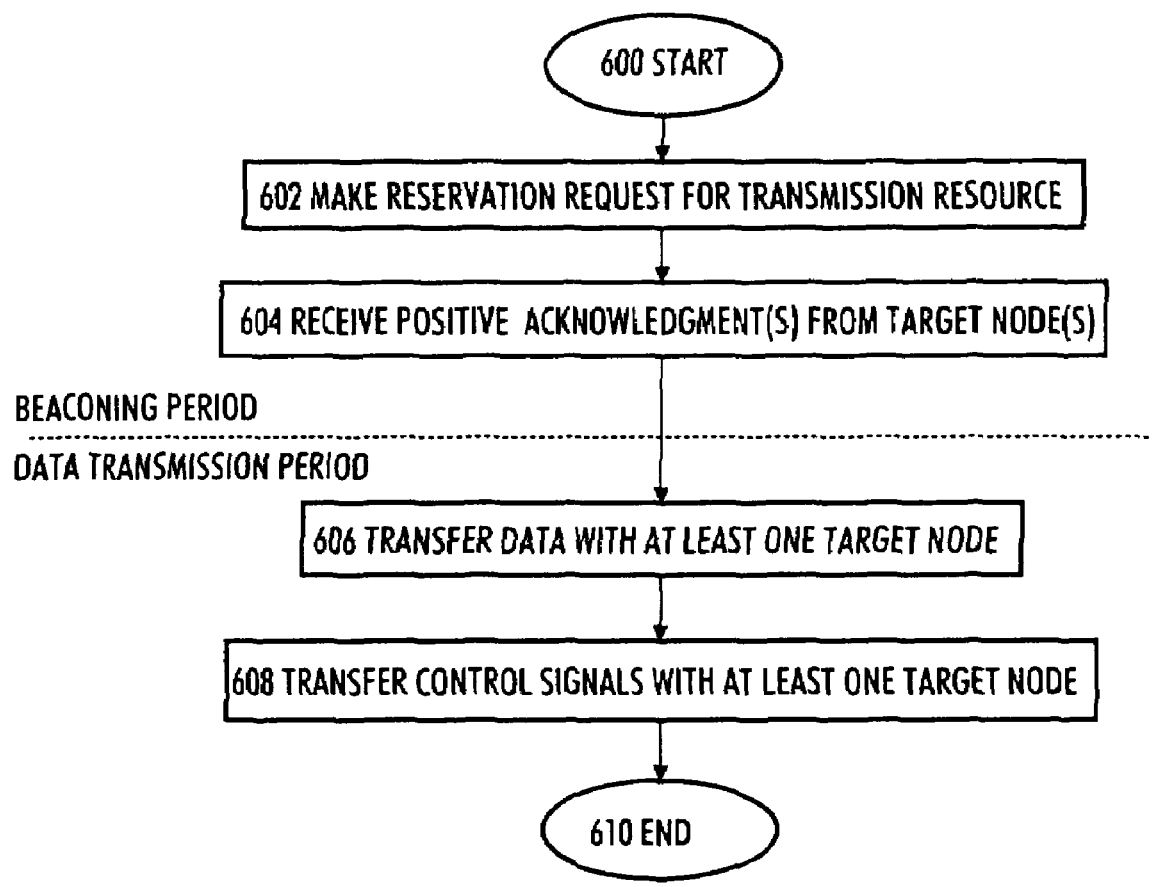
FIG. 6 is a flow diagram illustrating a process for reserving transmission resource and transferring data and control signals within the reserved transmission resources according to an embodiment of the invention.

According to yet another embodiment of the invention, the utilization of the reserved transmission resources and flexibility may be improved by transmitting control signals within the reserved transmission resources. According to conventional solutions, the reserved transmission resources are only used for transmitting data. This embodiment will be described as a process with reference to a flow diagram illustrated in FIG. 6. The process may be a computer process executed in a control unit of at least one node of the mesh network. The process starts in block 600.

In block 602, a source node sends a data transfer reservation request to at least one target node during a beaconing period. The one or more target nodes may be neighboring nodes of the source node. The source node may make a request to transmit data to one or more of the target nodes within the requested transmission resource, or the source node may request to be added to a recipient list of a particular target node within the transmission resource specified in the reservation request.

In block 604, the source node receives positive acknowledgments from the target node(s), and the reservation becomes valid. The responses are also received during the beaconing period. Data is then transferred between the source node and at least one target node during a data transmission period and within the reserved transmission resource in block 606. As mentioned above, the source node may be either a transmitter or a receiver of the data. According to the embodiment related to the multi-directional data transmission within the reserved transmission resource, the source node may be both a transmitter and a receiver of the data within the reserved transmission resource.

In addition to data, control signals are transferred between the source node and at least one target node within the reserved transmission resource in block 608. The control signaling may comprise signals carrying information on the transmit buffer status of recipient nodes of the reserved transmission resource. The recipient nodes may transmit the status of their respective buffers to a node controlling transmissions within the transmission resource. The status of the buffer refers to the amount of data buffered for transmission. The node controlling the transmissions within the transmission resource may then grant transmissions to the recipient nodes according to the status of their buffers. For example, the transmissions may be granted to the node(s) having the most data buffered for transmission. Messages granting the transmissions may also be transmitted as control signals within the reserved transmission resource. The messages granting the transmissions are transmitted by the node controlling the transmissions within the reserved transmission resource.

Also other types of control signals may be transmitted within the reserved transmission resource. As another example of control signals, a node may transmit a request to another node to instruct the other node to reserve a specified transmission resource during the next beaconing period. During the next beaconing period, the one of the two nodes having the beaconing transmission (reservation) sooner may request reservation of the specified transmission resource. The node may be the node transmitting the instruction to make the reservation or the node receiving the instruction. This type of control signaling within the reserved transmission resource ensures faster transmission resource allocation during the next beaconing period, since the transmission resource may be reserved as soon as either one of the two nodes gets a turn to make reservations.

Furthermore, transmission reservation requests may be transmitted as control signals within the transmission resource to request a transmission. A recipient node of the transmission resource may transmit a transmission request to the node controlling transmissions within the transmission resource. If there is a portion of the transmission resource available for the recipient node to transmit data, the node controlling the transmissions may grant the recipient node a portion of the transmission resource to perform the data transmission. On the other hand, if all the reserved transmission resources are already allocated for transmission of data, the node controlling the transmissions may return a control signal denying the request. The process ends in block 610.

The process described above with reference to FIG. 6 may embody one or more of the embodiments described above with reference to FIGS. 3 to 5. Accordingly, the process may support addition of multiple recipients for the same transmission resource and/or multi-directional data transmission within the reserved transmission period.

As mentioned above, the embodiments of the invention may be realized in a node of a mesh network. The node may be a communication device comprising a communication interface configured to provide a physical communication connection with other nodes of the mesh network. The communication device further comprises a control unit operationally connected to the communication interface. The control unit may be configured to perform a method for reservation management in a wireless network according to at least some of the steps described in connection with the flowchart of FIG. 4, and control the operations performed according to the description related to FIGS. 3 to 5. The embodiments may be implemented as a computer program comprising instructions for executing a computer process for controlling data transfer in the wireless mesh network.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method, comprising:
   transmitting, from a source node to at least one neighboring node, the at least one neighboring node comprising at least one target node, a data transfer reservation request for a transmission resource in a wireless network regardless of whether the source node has data to be transmitted or received;
   receiving, from the at least one neighboring node, an acknowledgment to reserve the requested transmission resource for data transfer between the source node and the at least one target node; and
   transferring data within the reserved transmission resource.

2. The method of claim 1, further comprising:
   determining from routing information available for the source node whether or not there will be data to be transferred from the at least one target node to the source node; and
   transmitting the data transfer reservation request upon determining that there will be data to be transferred from the at least one target node to the source node.

3. The method of claim 1, further comprising:
   reserving the transmission resource for data transfer from a transmitter node to at least one receiver node, wherein the transmitter node and the at least one receiver node form the source node and the at least one target node, respectively, and wherein the reservation of the transmission resource is counted as a single reservation.

4. The method of claim 3, further comprising:
transmitting data from the transmitter node to the at least one receiver node at different portions of the reserved transmission resource.

5. The method of claim 1, further comprising:
transmitting the data transfer reservation request for the transmission resource from a transmitter node representing the source node to a plurality of receiver nodes, each of the plurality of receiver nodes representing a target node;
receiving the acknowledgment for the data transfer from the plurality of receiver nodes; and
transmitting data from the transmitter node to the plurality of receiver nodes within the reserved transmission resource.

6. The method of claim 5, further comprising:
configuring each one of the plurality of receiver nodes to monitor the transmission resource for data addressed to the receiver node;
transmitting, from the transmitter node within the reserved transmission resource, data comprising a recipient field indicating a receiver node to which the data is addressed;
reading the recipient field in the plurality of receiver nodes; and
receiving the data in the receiver node to which the data is addressed.

7. The method of claim 1, further comprising:
transmitting the data transfer reservation request for the transmission resource from a plurality of receiver nodes to a transmitter node representing the target node, wherein each of the plurality of receiver nodes transmitting the data transfer reservation request represents the source node;
receiving the acknowledgment for the data transfer from the transmitter node; and
transmitting data from the transmitter node to the at least one receiver node within the reserved transmission resource.

8. The method of claim 1, further comprising:
transferring data in a plurality of directions within the reserved transmission resource under the control of a transmitter node, wherein the reservation of the transmission resource is counted as a single reservation.

9. The method of claim 8, further comprising:
transmitting, from the transmitter node, control signaling information to allocate transmissions within the reserved transmission resource.

10. The method of claim 8, further comprising:
transmitting data initially from the transmitter node within the reserved transmission resource;
transmitting from the transmitter node an end signal to indicate the end of the data transmission from the transmitter node; and
transmitting data within a remaining reserved transmission resource from another node in response to the end signal.

11. The method of claim 10, further comprising:
transmitting the data initially from the transmitter node to a given receiver node; and
transmitting an acknowledgment signal from the given receiver node to the transmitter node in response to the end signal, wherein the acknowledgment signal is configured to indicate whether or not the data transmitted from the transmitter node has been correctly received.

12. The method of claim 1, further comprising:
transmitting control-signaling information within the reserved transmission resource.

13. The method of claim 12, further comprising:
allocating portions of the reserved transmission resource to the source node and the at least one target node for data transmission.

14. The method of claim 12, further comprising:
making the data transfer reservation request during a reservation interval in which the source node and the at least one target node request in a determined order to reserve one or more transmission resources for data transfer; and
transmitting within the reserved transmission resource a control signal to the node making the data transfer reservation request first among the source node and the at least one target node, wherein the control signal instructs the node receiving the control signal to make a data transfer reservation request for a specified transmission resource during the next reservation interval.

15. The method of claim 1, further comprising:
requesting, from at least one of the source node and the at least one target node, an extension to the reserved transmission resource.

16. The method of claim 1, further comprising:
transmitting, from the source node to the at least one neighboring node, a reservation request for a transmission resource to reserve the transmission resource for another purpose other than for data transfer in the wireless network.

17. The method of claim 1, wherein the wireless network is a wireless ad-hoc network.

18. An apparatus, comprising:
an interface configured to transmit and receive signals; and
a control unit configured to
transmit, through the interface, a data transfer reservation request addressed to at least one neighboring node, the at least one neighboring node comprising at least one target node of a wireless network,
request a reservation for a transmission resource regardless of whether the control unit has data to be transmitted or received,
receive an acknowledgment from the at least one neighboring node to reserve the requested transmission resource for the data transfer with the at least one target node, and
transfer data within the reserved transmission resource.

19. The apparatus of claim 18, wherein the control unit is further configured to determine from routing information available for the control unit whether or not there will be data to be transferred from the at least one target node to the apparatus, and to transmit the data transfer reservation request upon determining that there will be data to be transferred from the at least one target node to the apparatus.

20. The apparatus of claim 18, wherein the control unit is further configured to request the reservation of the transmission resource for data transfer from a transmitter node to a plurality of receiver nodes, wherein the reservation of the transmission resource is counted as a single reservation.

21. The apparatus of claim 18, wherein the control unit is further configured to transmit the data transfer reservation request for the transmission resource addressed to a plurality of receiver nodes, to receive acknowledgments for the data transfer from the plurality of receiver nodes, and to transmit data addressed to the plurality of receiver nodes within the reserved transmission resource.

22. The apparatus of claim 21, wherein the control unit is further configured to configure each one of the plurality of target nodes to monitor the transmission resource for data addressed to the target node, and to transmit data comprising a recipient field comprising a receiver target node for which the data is addressed.

23. The apparatus of claim 21, wherein the control unit is further configured to transmit data to each of the plurality of receiver nodes in different portions of the reserved transmission resource.

24. The apparatus of claim 18, wherein the control unit is further configured to transmit the data transfer reservation request for the transmission resource, wherein the reservation request is addressed to a transmitter node determined as comprising data to be transmitted to the control unit, to receive the acknowledgment for the reservation request from the transmitter node, and to receive data from the transmitter node within the reserved transmission resource.

25. The apparatus of claim 24, wherein the control unit is further configured to transmit the data transfer reservation request for an already-reserved transmission resource so as to request an addition to the apparatus of a recipient list related to the transmission resource, wherein the recipient list comprises the at least one other recipient.

26. The apparatus of claim 24, wherein the control unit is further configured to monitor the reserved transmission resource for data addressed to the apparatus by reading recipient fields of the recipient list comprised in received data frames, and to obtain the data addressed to the apparatus.

27. The apparatus of claim 18, wherein the control unit is further configured to transfer data in a plurality of directions within the reserved transmission resource, wherein the reservation of the transmission resource is counted as a single reservation.

28. The apparatus of claim 27, wherein the control unit is further configured to control transmission within the reserved transmission resource by transmitting control signaling information to the at least on target node to allocate transmissions within the reserved transmission resource.

29. The apparatus of claim 27, wherein the control unit is further configured to transmit data initially within the reserved transmission resource, and to transmit an end signal configured to indicate the end of the data transmission to release remaining transmission resources for transmission of data from the at least one target node as a response to the end signal.

30. The apparatus of claim 29, wherein the control unit is further configured to transmit the data initially to a given target node, and to receive an acknowledgment signal from the given target node in response to the end signal, the acknowledgment signal indicating whether or not the data has been correctly received by the given target node.

31. The apparatus of claim 18, wherein the control unit is further configured to transmit control-signaling information within the reserved transmission resource.

32. The apparatus of claim 31, wherein the control unit is further configured to allocate portions of the reserved transmission resource to a source node and the at least one target node for data transmission.

33. The apparatus of claim 31, wherein the control unit is further configured to transmit the data transfer reservation request during a reservation interval, in which a source node and the at least one target node request in a determined order to reserve one or more transmission resources for data transfer, and to transmit within the reserved transmission resource a control signal to a target node making the data transfer reservation request first among the at least one target node, wherein the control signal instructs node receiving the control signal to make a data transfer reservation request for a specified transmission resource during the next reservation interval.

34. The apparatus of claim 31, wherein the control unit is further configured to transmit a request for an extension to the reserved transmission resource.

35. The apparatus of claim 18, wherein the apparatus is a node of a wireless network.

36. A wireless network, comprising:
a source node, the source node comprising
a communication interface configured to provide a communication connection with at least one other node; and
a control unit configured to
transmit, through the communication interface, to at least one other node, the at least one other node comprising at least one target node, a data transfer reservation request for a transmission resource regardless of whether the source node has data to be transmitted or received,
receive, from the at least one other node, an acknowledgment to reserve the requested transmission resource for data transfer between the source node and the at least one target node, and
transfer data with the at least one target node within the reserved transmission resource,
wherein the at least one target node comprises a communication interface configured to provide a communication connection with at least the source node and the control unit configured to receive, through the communication interface, the data transfer reservation request for the transmission resource from the source node; to transmit an acknowledgment for the reservation for the requested transmission resource to the source node, if the target node has no pending data transfer for the requested transmission resource; and to transfer data with the source node within the reserved transmission resource.

37. An apparatus, comprising:
means for transmitting a data transfer reservation request addressed to at least one neighboring node, the at least one neighboring node comprising at least one target node of a wireless network to request a reservation for a transmission resource regardless of whether the apparatus has data to be transmitted or received;
means for receiving an acknowledgment from the at least one neighboring node to reserve the requested transmission resource for the data transfer with the at least one target node; and
means for transferring data with the at least one target node within the reserved transmission resource.

38. A computer program embodied on a computer readable medium, the computer program being configured to control a processor to perform:
transmitting a data transfer reservation request addressed to at least one neighboring node, the at least one neighboring node comprising at least one target node of the wireless network to request a reservation for a transmission resource regardless of whether the control unit executing the computer process has data to be transmitted or received;
receiving an acknowledgment from the at least one neighboring node to reserve the requested transmission resource for the data transfer with the at least one target node; and
transferring data with the at least one target node within the reserved transmission resource.

* * * * *